Patented Apr. 23, 1929.

1,710,403

UNITED STATES PATENT OFFICE.

ROBERT B. CHAMBERLIN, OF PLAINFIELD, NEW JERSEY, ASSIGNOR TO VEGETABLE PRODUCTS, INC., A CORPORATION OF NEW JERSEY.

FOOD PRODUCT AND METHOD OF PRODUCING THE SAME.

No Drawing. Application filed February 26, 1927. Serial No. 171,386.

My invention relates to food products and particularly to a spreadable miscible composition for cooking, baking, frying, shortening and the like, and to a process of producing the same.

The object of the invention is to provide a composition of vegetable food stuffs which will be of high natural food value and pleasant taste and odor and easily used, while at the same time inexpensive in manufacture and readily preserved in desired plastic form, free from rancidity and not liable to deteriorate. Prior products, such as those in which mixtures of oils are aerated after mixing tend to become permanently oily with slight temperature increase and to cake very hard when the temperature is lowered. It is also necessary with these prior products to resort to hydrogenation or admixture of animal fats to impart the desired stiffness.

More particularly my invention comprises the combination in a homogeneous composition of a relatively stiff vegetable oil of high melting point and a relatively fluid vegetable oil of low melting point in such an intermixture as to give the desired physical properties to the composition and permanently maintain these properties.

The relatively stiff ingredient is preferably commercial refined cocoanut oil and the relatively fluid constituent is preferably peanut oil though, as hereinafter pointed out, substitutes may be used for either or both ingredients.

I have discovered that by incorporating air into the ingredients before mixing and then mixing them in this aerated condition the resulting composition will be a homogeneous plastic mass of a loose but firm texture and of a nature that will retain its form and consistency under the varying influences of all usual temperature changes. For instance vegetable oils such as cocoanut oil and peanut oil may be blended together into a new composition maintaining all the desired qualities of each ingredient and utilizing the stiffness of the cocoanut oil to give the product any desired melting point according to the season or the intended use of the material.

In the practice of the process I add to thirteen and one-half pounds of refined edible peanut oil about two to four ounces of a vegetable gum, the mixture being at a temperature of about 55°–60° F. To this I add one gallon of cold water (50° F. for instance) which may have dissolved in it table salt up to twenty-eight ounces. The water is added in a small stream and the mixture is stirred thoroughly until it is a thick aerated mass like an emulsion, the temperature being maintained around 50° F. to 60° F.

The cocoanut oil is separately melted to liquid form and permitted to stand to cool and when at a temperature of approximately 75° F. (for 76° cocoanut oil) has air mixed with it by rapidly agitating it with, for instance, an electric stirrer consisting of a shaft carrying small propeller blades. When properly worked up to an aerated condition and becoming thick and creamy the air will be retained by the semi-liquid oil which is then permitted to solidify. When solidified the aerated oil is cut up into small pieces, the size of a walnut, and in this form is ready for further use in the process.

Another batch of the cocoanut oil is melted to liquid form and permitted to stand to cool for instance to a temperature of slightly over 100° F.

Finally the ingredients are put together in a mixer, first thirty-five pounds of the liquid cocoanut oil and then thirty pounds of the aerated cocoanut oil in small pieces are added and the mixture is mixed until the lumps dissolve and the whole mass becomes smooth. There is then added another thirty-five pounds of the liquid cocoanut oil and the mixing is continued, the mass being brought to a temperature of about 70° F. To this aerated cocoanut oil there is added in a slow stream and while the mixer is in motion the cold emulsified peanut oil and water mixture (about twenty-two pounds). The agitation is continued just long enough to thoroughly mix these final ingredients, the temperature being in the neighborhood of 70° F. The composition in its aerated semi-fluid condition is run off into molds or bottles and cooled and after setting is ready for shipment within twenty-four hours.

The exact procedure and proportions may be varied according to the results desired, an increase of peanut oil lowering the melting point and an increase of cocoanut oil raising the melting point, which usually will be maintained between 85° F. and 110° F. In winter or in cold climates natural cocoanut oil, melting at about 76° F. and known as 76° oil, may be used and will give a product having an iodine absorption value of approximately 20, while for warmer conditions cocoanut oil hydrogenated to melt at 92° F. or 110° F. (and commercially known as 92° or 110° oil) may be substituted the proportions varying, of course, according to the stiffness desired and the iodine absorption value being approximately 10 or thereabouts. Instead of cocoanut oil I may use palm kernel oil, Babassu, coquito, or other vegetable oil such as cotton seed, peanut, sesame or corn oil hardened, if necessary, by hydrogenation.

Instead of peanut oil the process is also applicable to other vegetable oils such as cotton seed oil, and such substitute oil may, if desired, be hydrogenated to any degre giving the desired consistency to the product. The vegetable gum mixed with the liquid vegetable oil is preferably Indian gum, Karaya, obtained from Sterculia Campanulata, or tragacanth (astragulus gumnifer) or gum arabic.

The mixing of the oils by aeration brings them into a very smooth and homogeneous blend, and below the melting point of the composition there is no tendency of the ingredients to separate out. At all usual temperatures below melting the composition is of perfect consistency throughout and is easily controlled in proportion of ingredients to give any desired softness or stiffness. This invention makes its unnecessary to use animal fats or derivatives usual in the present shortening compositions and provides a composition entirely of vegetable oils in which one or both of the oils is in its natural condition not hydrogenated or changed chemically from its natural state. In the above examples for instance the iodine absorption value is above that of the chief ingredient, the natural cocoanut oil. In my process the separate aeration of the heavy oil and the light oil and their subsequent intermixing gives a final product in which the aerated particles or globules of each ingredient are present thoroughly intermingled. The light oil is also mixed with water in an emulsified condition and the result in the ultimate product is that the final plastic form is maintained throughout all usual temperature variations between 40° and 90° F. without tendency of the mass to harden unduly at low temperatures or to become liquid and oily at higher temperatures.

In the above specification and the following claims the term "vegetable oil" is intended to include nut oils, these being obviously oils of vegetable origin.

I claim:

1. A food product comprising a mixture of a major proportion of a vegetable oil in aerated condition and having a relatively high melting point, and a minor proportion of a second vegetable oil in aerated condition and having a relatively low melting point, the mixture being a smooth homogeneous combination of the said ingredients as a plastic food stuff.

2. A food product comprising a mixture of a major proportion of a cocoanut oil in aerated condition and having a relatively high melting point, and a minor proportion of a second vegetable oil in aerated condition and emulsified with water and having a relatively low melting point, the mixture being a smooth homogeneous combination of the said ingredients as a plastic food stuff.

3. A food product comprising a mixture of a major proportion of a vegetable oil in aerated condition and having a relatively high melting point, and a minor proportion of peanut oil in aerated condition and emulsified with water and having a relatively low melting point, the mixture being a smooth homogeneous combination of the said ingredients as a plastic food stuff.

4. A food product comprising a mixture of a major proportion of a vegetable oil in aerated condition and having a relatively high melting point, a minor proportion of a second vegetable oil in aerated condition and having a relatively low melting point, and a vegetable gum intimately mixed aerated with said second mentioned oil, the mixture being a smooth homogeneous combination of the said ingredients as a plastic food stuff.

5. The process of producing a food product comprising aerating a vegetable oil of relatively high melting point so as to leave it in aerated condition, aerating a second vegetable oil of relatively low melting point, and then intermixing said aerated oils into a homogeneous plastic mass suitable for a food stuff.

6. A food product comprising a major proportion of cocoanut oil in aerated condition, and a minor proportion of peanut oil in aerated condition, the mixture being a smooth homogeneous combination of the said ingredients as a plastic food stuff and having an iodine absorption value of ten or more.

ROBERT B. CHAMBERLIN.